US012458020B2

(12) United States Patent
Macom et al.

(10) Patent No.: US 12,458,020 B2
(45) Date of Patent: Nov. 4, 2025

(54) SYNERGISTIC HERBICIDAL MIXTURES AND COMPOSITIONS COMPRISING TRICLOPYR AND PHOSPHATE ESTER ADJUVANTS

(71) Applicant: SBM Développement SAS, Ecully (FR)

(72) Inventors: Thomas Eli Macom, Holly Springs, NC (US); Robert Britt Baker, Cary, NC (US)

(73) Assignee: SBM Développement SAS, Ecully (FR)

( * ) Notice: Subject to any disclaimer, the term of this patent is extended or adjusted under 35 U.S.C. 154(b) by 901 days.

(21) Appl. No.: 17/423,716

(22) PCT Filed: Jan. 16, 2020

(86) PCT No.: PCT/US2020/013833
§ 371 (c)(1),
(2) Date: Jul. 16, 2021

(87) PCT Pub. No.: WO2020/150447
PCT Pub. Date: Jul. 23, 2020

(65) Prior Publication Data
US 2022/0079152 A1 Mar. 17, 2022

Related U.S. Application Data

(60) Provisional application No. 62/794,066, filed on Jan. 18, 2019.

(51) Int. Cl.
*A01N 43/40* (2006.01)
(52) U.S. Cl.
CPC .................................. *A01N 43/40* (2013.01)
(58) Field of Classification Search
CPC ....................................................... A01N 43/40
See application file for complete search history.

(56) References Cited

U.S. PATENT DOCUMENTS

| 4,822,407 A | 4/1989 | Esposito |
| 5,877,112 A | 3/1999 | Roberts et al. |
| 2007/0191229 A1 | 8/2007 | Pompeo et al. |
| 2007/0275854 A1 | 11/2007 | Hess et al. |
| 2008/0254983 A1 | 10/2008 | Panayi et al. |
| 2011/0257012 A1 * | 10/2011 | Stagg ..................... A01N 33/12 504/254 |
| 2012/0184441 A1 | 7/2012 | Ouse et al. |
| 2013/0252817 A1 | 9/2013 | Shao et al. |
| 2017/0055529 A1 | 3/2017 | Mann et al. |

FOREIGN PATENT DOCUMENTS

| CA | 2927210 A1 | 5/2015 | |
| CA | 2945782 A1 | 10/2015 | |
| CA | 2945784 A1 | 10/2015 | |
| CN | 105764336 A | 7/2016 | |
| CN | 106455547 A | 2/2017 | |
| CN | 106455549 A | 2/2017 | |
| DE | 102004047092 A1 | 3/2006 | |
| JP | 2016535056 A | 11/2016 | |
| JP | 2017511364 A | 4/2017 | |
| JP | 2017513851 A | 6/2017 | |
| MX | 341735 B | 8/2016 | |
| RU | 2016144352 A | 5/2018 | |
| RU | 2016144475 A | 5/2018 | |
| TW | 201542086 A | 11/2015 | |
| TW | 201542087 A | 11/2015 | |
| WO | WO-2008011511 A2 * | 1/2008 | ............. A01N 41/10 |

OTHER PUBLICATIONS

Clariant, Synergen OS (accessed on Nov. 19, 2024 from https://www.clariant.com/en/Solutions/Products/2016/06/03/14/53/Synergen-OS, pp. 1-8). (Year: 2024).*
CAS #105362-40-1 (SciFinder Scholar, 3 pages, accessed Nov. 19, 2024) (Year: 2024).*
"Methylated Seed OilTM" (pp. 1-2, accessed on Jul. 5, 2024, accessed from https://www.kalo.com/media/hvlfdijy/specimen-label.pdf) (Year: 2024).*
International Search Report and Written Opinion corresponding to International Application No. PCTUS2020013833, Apr. 24, 2020, 9 pages.

* cited by examiner

*Primary Examiner* — Alma Pipic
(74) *Attorney, Agent, or Firm* — Myers Bigel, P.A.

(57) ABSTRACT

The invention relates to synergistic herbicidal mixtures and compositions comprising triclopyr (3,5,6-Trichloro-2-pyridinyloxyacetic acid), a salt thereof and/or an ester thereof, and at least one phosphate ester adjuvant, and methods of use thereof.

22 Claims, 7 Drawing Sheets

SYNERGISTIC HERBICIDAL MIXTURES AND COMPOSITIONS COMPRISING TRICLOPYR AND PHOSPHATE ESTER ADJUVANTS

STATEMENT OF PRIORITY

This application claims the benefit, under 35 U.S.C. § 119 (e), of U.S. Provisional Application No. 62/794,066 filed on Jan. 18, 2019, the entire contents of which is incorporated by reference herein.

FIELD OF THE INVENTION

The invention relates to methods for synergistic herbicidal mixtures and compositions, and methods of using the same.

BACKGROUND OF THE INVENTION

Herbicides containing triclopyr are commonly used in residential, agricultural, recreational, and industrial settings for the control of weeds. However, treatment with this herbicide may take longer to show observable phytotoxicity and re-emergence may occur earlier than is desirous by the end user. Triclopyr is mainly used to control woody plants and broadleaf weeds with some action against grassy weeds. The mode of action of triclopyr is not well understood but acts like an endogenous auxin (IAA) and other auxin-type herbicides, which tend to be slower acting. Triclopyr phytotoxicity usually occurs about 3 to 5 weeks and shows in the form of epinasty (bending), stem elongation, wilting, leaf cupping and curling with browning occurring after the death of the vascular tissue. Persistence of triclopyr in the soil is moderate with a half-life of about 30 days. In addition, several invasive and/or nuisance plants appear to have resistance to current formulations of triclopyr.

SUMMARY OF THE INVENTION

One aspect of the invention provides a synergistic herbicidal mixture comprising: triclopyr (3,5,6-Trichloro-2-pyridinyloxyacetic acid), a salt thereof and/or ester thereof, and at least one phosphate ester adjuvant.

A second aspect of the invention provides a method of controlling plant growth comprising contacting a plant, plant part and/or a plant environment with an effective amount of a mixture of the present invention.

A further aspect of the invention provides a method of controlling plant growth comprising contacting a plant, plant part, and/or plant environment with an effective amount of a composition comprising triclopyr (3,5,6-Trichloro-2-pyridinyloxyacetic acid), a salt, thereof and/or an ester thereof, and a composition comprising at least one phosphate ester adjuvant.

These and other aspects of the invention are set forth in more detail in the description of the invention below.

DETAILED DESCRIPTION

Figure 1:
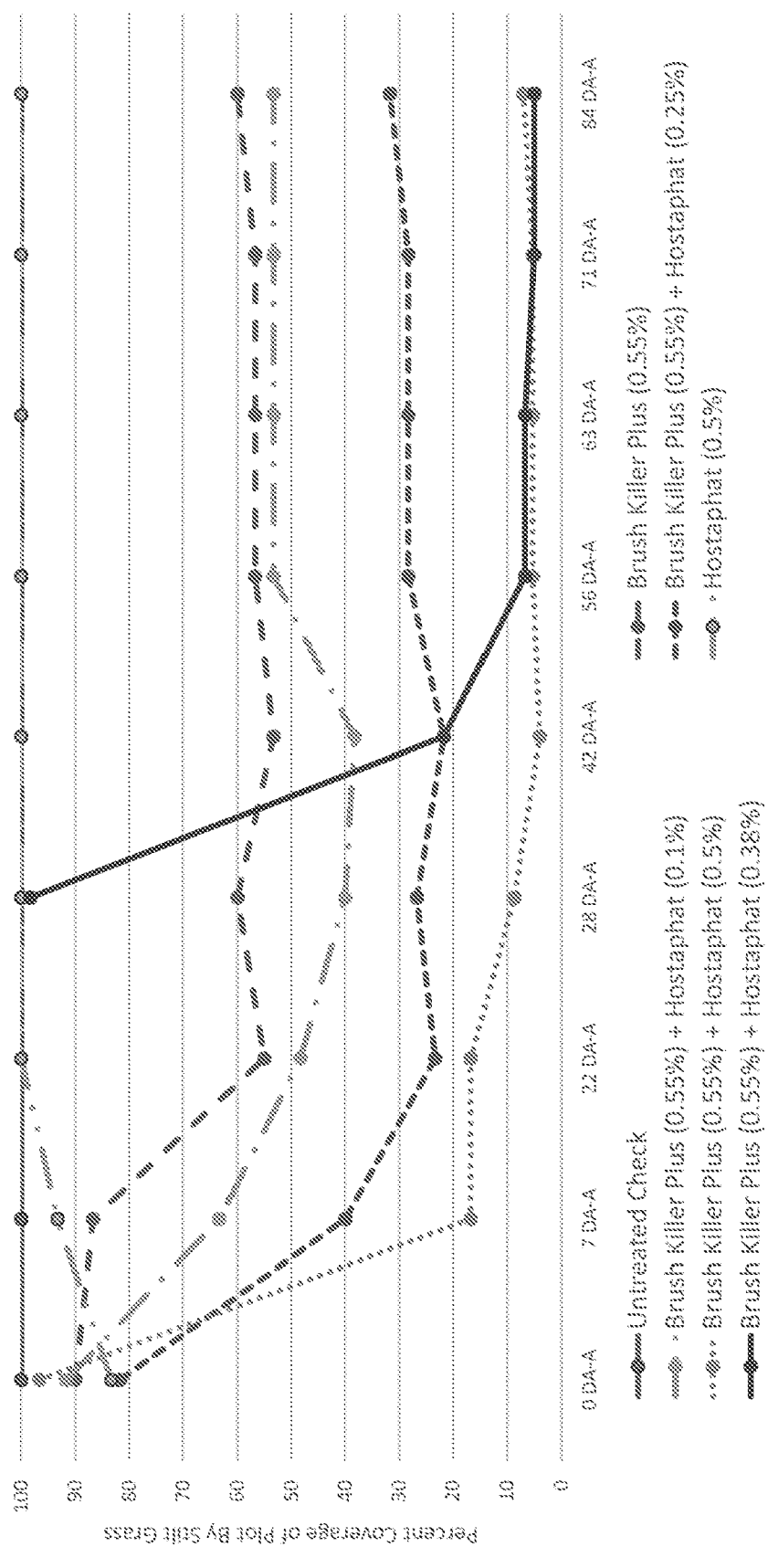
FIG. 1 shows the average coverage of Japanese stilt grass in plots treated with triclopyr (Brush Killer Plus®) plus the adjuvant Hostaphat® 1306 (active ingredient: alkyl polyethylene glycol ether phosphoric acid mono/diester (50150), acid form) at different adjuvant concentrations. Treatment groups shown are an untreated check, triclopyr alone (Brush Killer Plus® (0.55% w/v), triclopyr (0.55% w/v) plus adjuvant (0.25% w/v), triclopyr (0.55% w/v) plus adjuvant (0.5%), triclopyr (0.55% w/v) plus adjuvant (0.1% w/v), triclopyr (0.55% w/v) plus adjuvant (0.38% w/v), and adjuvant alone (at 0.5% w/v). X-axis shows days after administration (DA-A) of the first set of treatment groups (all treatment groups except triclopyr (0.55% w/v) plus adjuvant (0.38% w/v)). Treatment group triclopyr (0.55% w/v) plus adjuvant (0.38% w/v) was initiated after all other groups, at DA-A 28.

The present invention now will be described hereinafter with reference to the accompanying drawings and examples, in which embodiments of the invention are shown. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The term "about," as used herein when referring to a measurable value such as an amount or concentration and the like, is meant to encompass variations of ±10%, ±5%, ±1%, ±0.5%, or even ±0.1% of the specified value as well as the specified value. For example, "about X" where X is the measurable value, is meant to include X as well as variations of ±10%, ±5%, ±1%, ±0.5%, or even ±0.1% of X.

A range provided herein for a measureable value may include any other range and/or individual value therein. Thus, a recitation of ranges of values herein are merely intended to serve as a shorthand method of referring individually to each separate value falling within the range, unless otherwise indicated herein, and each separate value is incorporated into the specification as if it were individually recited herein. For example, if the range 10 to 15 is disclosed, then 11, 12, 13, and 14 are also disclosed, as well as the ranges of 10 to 13, 11 to 14, etc.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

The term "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase. "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

As used herein, the terms "increase," "increasing," "increased," "enhance," "enhanced," "enhancing," and "enhancement" (and grammatical variations thereof) describe an elevation of at least about 5%, 10%, 15%, 20%, 25%, 50%, 75%, 100%, 150%, 200%, 300%, 400%, 500% or more as compared to a control.

As used herein, the terms "reduce," "reduced," "reducing," "reduction," "diminish," and "decrease" (and grammatical variations thereof), describe, for example, a decrease of at least about 5%, 10%, 15%, 20%, 25%, 35%, 50%, 75%, 80%, 85%, 90%, 95%, 97%, 98%, 99%, or 100% as compared to a control. In particular embodiments, the reduction can result in no or essentially no (i.e., an insignificant amount, e.g., less than about 10% or even 5%) detectable activity or amount.

"Alkyl" as used herein alone or as part of another group, refers to a straight or branched chain hydrocarbon containing from 1 to 20 carbon atoms, 1 to 10 carbons, or 1 to 6 carbons, which can be referred to as a C1-C20 alkyl, C1-C10 alkyl or C1-C6 alkyl. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Loweralkyl" as used herein, is a subset of alkyl, and, in some embodiments, refers to a straight or branched chain hydrocarbon group containing from 1 to 4 carbon atoms. Representative examples of loweralkyl include, but are not limited to, methyl, ethyl, n-propyl, iso-propyl, n-butyl, iso-butyl, tert-butyl, and the like. The term "alkyl" or "loweralkyl" is intended to include both substituted and unsubstituted alkyl or loweralkyl unless otherwise indicated and these groups may be substituted with groups selected from halo, alkyl, haloalkyl, alkenyl, alkynyl, cycloalkyl, cycloalkylalkyl, aryl, arylalkyl, heterocyclo, heterocycloalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocycloalkyloxy, mercapto, alkyl-S(O)$_m$, haloalkyl-S(O)$_m$, alkenyl-S(O)$_m$, alkynyl-S(O)$_m$, cycloalkyl-S(O)$_m$, cycloalkylalkyl-S(O)$_m$, aryl-S(O)$_m$, arylalkyl-S(O)$_m$, heterocyclo-S(O)$_m$, heterocycloalkyl-S(O)$_m$, amino, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1, 2 or 3.

"Alkoxy" as used herein alone or as part of another group, refers to an alkyl or loweralkyl group, as defined herein (and thus including substituted versions such as polyalkoxy), appended to the parent molecular moiety through an oxy group, —O—. Representative examples of alkoxy include, but are not limited to, methoxy, ethoxy, propoxy, 2-propoxy, butoxy, tert-butoxy, pentyloxy, hexyloxy and the like.

"Alkoxyalkyl" as used herein alone or as part of another group, refers to an alkyl or loweralkyl group, as defined herein (and thus including substituted versions such as polyalkoxy), appended to another alkyl or loweralkyl group through an oxy group, —O—, such as, but not limited to, —CH$_2$CH$_2$OCH$_2$CH$_2$CH$_3$.

As used herein, the term "plant part" refers to at least a fragment of a whole plant. Mixtures and compositions of the present invention may be applied to or contacted with any suitable plant part, including, but not limited to, anthers, branches, buds, calli, clumps, cobs, cotyledons, ears, embryos, filaments, flowers, fruits, husks, kernels, leaves, lodicules, ovaries, palea, panicles, pedicels, pods, pollen, protoplasts, roots, root tips, seeds, silks, stalks, stems, stigma, styles, and tassels. In some embodiments, a composition of the invention is synergistic (e.g., achieves a synergistic effect when applied to a plant or part thereof). "Synergistic," "synergy," or grammatical variants thereof as used herein refer to a combination exhibiting an effect greater than the effect that would be expected from the sum of the effects of the individual active ingredients of the combination alone. For example, the terms "synergistic" or "synergy" with regard to a combination of triclopyr and a phosphate ester adjuvant when contacted with a plant, plant part or plant environment refers to increased control of growth of a plant and/or plant part; increased control of growth of a plant and/or plant part over time; increased rate of observable plant phytotoxicity; reduced time to observable phytotoxicity; increased residual control of a plant and/or plant part, reduced seed germination and/or reduced seed germination over time that is greater than that which would be expected from the sum of the individual effects of the triclopyr or the phosphate ester adjuvant alone. Synergy or a synergistic effect can be calculated using methods known to those of skill in the art.

As used herein, a "plant environment" is any area where a plant or plant part may be found and for which control of the plant or plant part is desirable. Non-limiting examples of a plant environment may include soil or a substrate (synthetic or natural) in which a plant or plant part may be found. In some embodiments, the plant environment may be contacted with the mixtures and/or compositions of the invention in the presence of a plant or plant part. In some embodiments, a plant environment may be contacted with the mixtures and/or compositions of the invention concurrently with contacting a plant or plant part present in the plant environment. In some embodiments, a plant environment may be contacted with the mixtures and/or compositions of the invention prior to the presence of a plant or plant part, e.g., in the absence of a plant or plant part. Thus, in some embodiments, control of plant growth may be observed when the plant environment only is contacted/treated with the mixtures and/or compositions of the invention (e.g., reducing growth of plants and/or plant parts that are later introduced into the plant environment).

As used herein, "control of growth" means reducing the growth of a plant or a plant part, and can include death of the plant or plant part. Control of growth may include, but is not limited to, reducing growth of a plant or plant part over time, and/or producing observable plant and/or plant part phytotoxicity, and/or a more rapid observable phytotoxicity to the plant and/or plant part. Control of growth may also include, but is not limited to, residual control (and/or increased residual control) of a plant and/or plant part, reducing seed germination and/or reducing seed germination over time.

As used herein, the term "observable phytotoxicity" refers to observable phenotypes of decline of a plant and/or plant part, following contact with a mixture or composition of the present invention, and includes, but is not limited to, such phenotypic characteristics as dehydration, wilting, leaf curling, discoloration (e.g., chlorosis, browning, and the like), and necrosis. "Discoloration" may include any change in color from the natural color of the tissue prior to application of a composition or mixture of the invention. Thus, discoloration can include, but is not limited to, yellowing (e.g., chlorosis) and browning. A phenotype can be observable to the naked eye, or by any other means of evaluation known in the art, e.g., microscopy, biochemical analysis, or an electromechanical assay.

As used herein, the term "residual control" is defined as control of regrowth/re-emergence, seed germination, and/or plant migration (by runners, roots, seeds or other plant propagules (e.g., stolons, tubers, rhizomes and/or bulbs and the like; i.e., any structure from which a plant can arise)) into treatment area from outside of treatment area.

The present inventors have surprisingly discovered that triclopyr when combined with at least one phosphate ester adjuvant provides control of plant growth that is synergistic when compared to a plant, plant part and/or plant environment contacted with triclopyr alone or the at least one phosphate ester adjuvant alone (an effect that is greater than the effect that would be expected from the sum of the individual effects of the individual components of the composition of the invention (i.e., a synergistic effect)), the synergistic effect being, for example, increased control of growth of a plant and/or plant part; increased control of growth of a plant and/or plant part over time; increased rate of observable plant and/or plant part phytotoxicity; reduced time to observable phytotoxicity; increased residual control of a plant and/or plant part, reduced seed germination and/or reduced seed germination over time as compared to a control (e.g., a plant, plant part and/or plant environment contacted with triclopyr alone or the at least one phosphate ester adjuvant alone).

In some embodiments, the present invention provides a synergistic herbicidal mixture comprising: triclopyr (3,5,6-Trichloro-2-pyridinyloxyacetic acid), a salt thereof and/or an ester thereof (or any combination thereof), and at least one phosphate ester adjuvant (e.g., 1, 2, 3, 4, 5, or more). In some embodiments, the present invention provides a composition comprising triclopyr and a composition comprising at least one phosphate ester adjuvant (e.g., 1, 2, 3, 4, 5, or more). In some embodiments, the present invention provides a composition comprising triclopyr and at least one phosphate ester adjuvant, i.e., triclopyr (and/or a salt thereof and/or an ester thereof) and at least one phosphate ester adjuvant in the same (a single) composition.

Triclopyr useful for mixtures and compositions of the invention may be any derivative comprising triclopyr including, but not limited to, a salt and/or an ester of triclopyr or any combination thereof. Non-limiting examples of a triclopyr salt may comprise triethylamine (TEA), lithium, sodium, potassium, or tetrasubstituted ammonium salt. In some embodiments, a tetrasubstituted ammonium salt may be, but is not limited to, choline (e.g., triclopyr-chioline ((2-hydroxy-N,N,N-trimethylethanaminium 2-[(3, 5,6-trichloro-2-pyridinyl)oxy]acetate)), tetramethyl ammonium, or tetraethyl ammonium. In some embodiments, an ester of triclopyr may be an alkoxyalkyl ester. In some embodiments, an alkoxyalkyl ester of triclopyr may be, but is not limited to, butoxyethyl (BEE) triclopyr.

Non-limiting examples of structures of triclopyr and triclopyr salts and derivatives useful with the invention include:

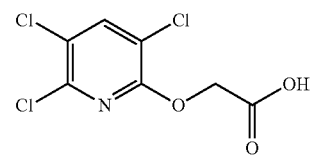

triclopyr
(((3,5,6-trichloro-2pyridinyl)oxy)acetic acid)

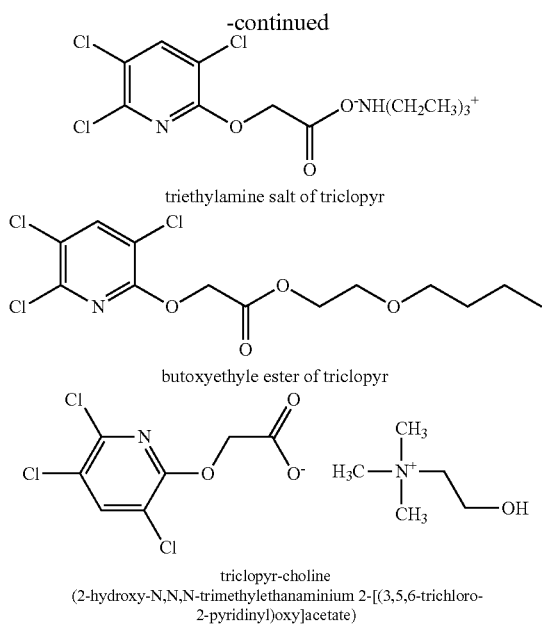

triethylamine salt of triclopyr butoxyethyle ester of triclopyr triclopyr-choline
(2-hydroxy-N,N,N-trimethylethanaminium 2-[(3,5,6-trichloro-2-pyridinyl)oxy]acetate)

A phosphate ester adjuvant useful for the mixtures and compositions of the present invention may be any phosphate ester that provides synergistic herbicidal activity when used in combination with triclopyr. Non-limiting examples of such phosphate ester adjuvants may include Methylated Seed Oil (MSO); a combination of alkanolamides, free fatty acids, alkyl aryl polyoxylkane ethers, dimethylpolysiloxane (INDUCE® Adjuvant); SYNERGEN® OS a cross-linked polyglycerol ester in methylated seed oil; C8/C10 glucamide (SYNERGEN® GA); ethoxylated C12-16 alcohols (CAS #68551-12-2, SYNERGEN® KN); alkyl polyethylene glycol ether phosphoric acid mono/diester (50/50), acid form (CAS #73038-25-2, SYNERGEN® KN); alkyl polyethylene glycol ether phosphoric acid mono/diester (50/50), acid form (CAS #73038-25-2, HOSTAPHAT® 1306); phosphated nonylphenol ethoxylate (CAS #68412-53-3, RHODAFAC® RE-610); phosphated nonylphenol ethoxylate, partial sodium salt (CAS #68954-84-7, RHODAFAC® LO-529); tristyrylphenol ethoxylate phosphate ester (acid form) or ethoxylated polyarylphenol phosphate ester (CAS #90093-37-1, SOPROPHOR® 3D33); ethoxylated tristyrylphenol phosphate potassium salt (CAS #163436-84-8, SOPROPHOR® FLK); tridecyl alcohol ethoxylate phosphate ester, POE-6 (CAS #9046-01-9, STEPFAC® 8181); tridecyl alcohol ethoxylate phosphate ester, POE-6 K Salt (CAS #261627-68-3, STEPFAC® 8181K); tridecyl alcohol ethoxylate phosphate ester, POE-6 K Salt (CAS #261627-68-3, STEPFAC® 8181 PT3K); ethoxylated alcohol phosphate ester (CAS #s 68610-21-9 and 68130-47-2 (Alt), STEPFAC® 3675); nonylphenol ethoxylate phosphate ester, POE-12 (CAS #s 51811-79-1, 68412-53-3 (Alt), and 7664-38-2 (Alt), STEPFAC® 8175); tristyrylphenol ethoxylate, POE-16, phosphate ester TEA Salt (CAS #105362-40-1, STEPFAC® TSP PE-N), or a blend thereof, or any combination thereof. In some embodiments, a phosphate ester adjuvant useful with the invention does not include potassium salt STEPFAC® 8181K.

Any combination of phosphate ester adjuvants that provide synergistic herbicidal activity when used in combination with triclopyr may be included in the mixtures and/or compositions of the invention. Thus, in some embodiments, a mixture or a composition of the invention may comprise a single phosphate ester adjuvant or more than one phosphate ester adjuvant. In some embodiments, a phosphate ester adjuvant (or more than one phosphate ester adjuvant) may be included in a blend comprising one or more other compounds having chemistries that are compatible with the phosphate ester adjuvant (and/or compatible with triclopyr when in the same composition or mixture). In some embodiments, the invention provides a blend comprising triclopyr, one or more phosphate ester adjuvants, and/or or more other compounds having chemistries that are compatible with the triclopyr and one or more phosphate ester adjuvants.

In some embodiments, a phosphate ester adjuvant may be in a mixture with triclopyr, wherein the phosphate ester adjuvant and triclopyr are applied together, or the phosphate ester adjuvant may be in a standalone composition that may be contacted with the plant, plant part, and/or plant environment concurrently, prior to, or after a composition comprising triclopyr is contacted with the plant, plant part and/or plant environment.

In some embodiments, a synergistic herbicidal mixture and/or composition of the invention may comprise triclopyr in an amount of about 0.05% weight/volume (w/v) to about 10% w/v of the mixture and/or composition, e.g., about 0.05, 0.10, 0.5, 1.0, 2, 3, 4, 5, 6, 7, 8, 9, or 10% w/v, or any range or value therein. In some embodiments, the amount of triclopyr may be in a range of about 0.1% to about 2% w/v or any range or value therein, of the mixture and/or composition. In some embodiments, the amount of triclopyr may be in a range of about 0.5% to about 8% w/v, and/or any range or value therein, of the mixture and/or composition. In some embodiments, the amount of triclopyr may be in a range of about 0.5% to about 5% w/v, and/or any range or value therein, of the mixture and/or composition. In some embodiments, the amount of triclopyr may be in a range of about 0.05% to about 1% w/v, and/or any range or value therein, of the mixture and/or composition. In some embodiments, the amount of triclopyr may be in a range of about 5% to about 10%, about 5% to about 9%, about 6% to about 10%, about 6% to about 9%, about 7% to about 10%, about 7% to about 9% w/v, and/or any range or value therein, of the mixture and/or composition.

One or more phosphate esters may be present in a mixture and/or in a composition of the present invention in any amount that when contacted with a plant, plant part, and/or plant environment concurrently, prior to, or after contact with triclopyr provides synergistic herbicidal activity. In some embodiments, a mixture and/or a composition of the invention may comprise an amount of a phosphate ester adjuvant in a range of about 0.01% w/v and about 10% w/v of the mixture and/or composition, e.g., about 0.01, 0.05, 0.25, 0.5, 0.75, 1, 2, 3, 4, 5, 6, 7, 8, 9, or 10% w/v, or any value or range therein, of the mixture and/or composition. In some embodiments, the amount of phosphate ester adjuvant in a mixture and/or composition may be in a range of about 0.1% to about 10%, about 0.1% to about 8%, about 0.1% to about 5%, about 0.2% to about 3%, about 0.2% to about 5%, about 0.2% to about 10%, about 0.25 to about 2.75%, or about 0.25 to about 5% w/v of the mixture and/or composition. In some embodiments, the amount of phosphate ester adjuvant in a mixture and/or composition may be in a range of about 3% to about 10%, about 5% to about 10%, about 5.5% to about 9.75%, or about 5% to about 10% w/v, or any value or range therein, of the mixture and/or composition. In some embodiments, the amount of phosphate ester adjuvant in a mixture and/or composition of the invention may be in a range of about 0.5 to about 9% w/v of the mixture and/or composition.

In some embodiments, a mixture and/or a composition of the invention may comprise an amount of a phosphate ester adjuvant in a range of about 1% w/w and about 160% w/w of the mixture and/or composition, e.g., about 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 25, 30, 35, 40, 45, 50, 55, 60, 65, 70, 75, 80, 85, 90, 95, 100, 110, 120, 130, 140, 150, 160, 170, 180% w/w, or any value or range therein, of the mixture and/or composition.

A synergistic herbicidal mixture and/or composition of the invention may be provided in any formulation useful for application to/contact with a plant, plant part, and/or a plant environment (e.g., an area where the plant is present, e.g., a plant substrate (synthetic or natural), e.g., a soil) for control of plant growth (e.g. weed control). In some embodiments, a synergistic herbicidal mixture and/or composition may be in the form of a liquid or a solid (e.g., a spray, an aqueous solution, a non-aqueous solution, a suspension, an emulsion (e.g., in oil (vegetable or mineral)), a flowable mixture, a slurry, a powder, a particle, a granule, a mist, an aerosol, a foam, and/or any combination thereof.

In some embodiments, a synergistic herbicidal mixture and/or composition of the invention may be provided in a "ready-to-use" formulation and/or in a concentrated formulation to be diluted prior to application to a plant, plant part, and/or plant environment. In some embodiments, a concentrated formulation of a mixture or composition of the invention may comprise triclopyr in an amount in a range of about 5% to about 10% w/v of the mixture and/or composition, e.g., about 5, 5.5, 6, 6.5, 7, 7.5, 8, 8.5, 9, 9.5, 10% w/v, or any range or value therein, of the mixture and/or composition. Thus, in some embodiments, the amount of triclopyr in a concentrated formulation may be in a range of about 6% to about 10%, about 7% to about 10%, about 6% to about 9% or about 7% to about 9% w/v, or any range or value therein, of the mixture and/or composition. In some embodiments, the amount of triclopyr in a concentrated formulation may be about 8% w/v of the mixture and/or composition. In some embodiments, a concentrated formulation of a mixture and/or composition of the invention may comprise a phosphate ester adjuvant (or blend thereof) in an amount in a range of about 5% to about 10% w/v of the mixture and/or composition, e.g., about 5, 5.5, 6, 6.5, 7, 7.5, 8, 8.5, 9, 9.5, 10% w/v, or any range or value therein, of the mixture and/or composition. Thus, in some embodiments, the amount of phosphate ester adjuvant in a concentrated formulation may be in a range of about 6% to about 10%, about 7% to about 10%, about 6% to about 9% or about 7% to about 9% w/v, or any range or value therein, of the mixture and/or composition. In some embodiments, the amount of phosphate ester adjuvant in a concentrated formulation may be about 8.8% w/v of the mixture and/or composition. In some embodiments, a concentrated formulation of a mixture and/or composition of the invention may comprise triclopyr in an amount of about 8.8% w/v of the mixture and/or composition and at least one phosphate ester adjuvant in an amount of about 8% w/v of the mixture and/or composition.

A ready-to-use (RTU) formulation of a synergistic herbicidal mixture and/or composition of the invention does not require further dilution before it may be applied to a plant, plant part and/or plant environment. A ready-to-use formulation may be prepared by diluting a concentrated formulation of a mixture or composition of the invention. In some embodiments, a ready-to-use formulation of a synergistic herbicidal mixture and/or composition may comprise triclopyr in an amount in the range of about 0.1% to about 5% w/v of the mixture and/or composition, e.g., about 0.1, 0.2, 0.3, 0.4, 0.5, 0.6, 0.7. 0.8, 0.9, 1, 1.1, 1.2, 1.3, 1.4, 1.5, 1.6, 1.7, 1.8, 1.9, 2, 2.25, 2.5, 2.75, 3, 3.25, 3.5, 3.75, 4, 4.25, 4.5, 4.75, 5% w/v, or any range or value therein, of the mixture and/or composition. Thus, in some embodiments, the amount of triclopyr in a mixture and/or composition that is a ready-to-use formulation may be in a range of about 0.1% to about 4%, about 0.1% to about 3%, about 0.1% to about 2%, about 0.1% to about 1%, about 0.1% to about 0.7%, about 0.2% to about 4%, about 0.2% to about 3%, about 0.2% to about 2%, about 0.2% to about 1% w/v, about 0.2% to about 0.6% w/v, or any range or value therein, of the mixture and/or composition. In some embodiments, the amount of triclopyr in a ready to use formulation may be about 0.275% w/v of the mixture and/or composition. In some embodiments, the amount of triclopyr in a ready-to-use formulation may be about 0.55% w/v of the mixture and/or composition. In some embodiments, a ready-to-use formulation of a mixture and/or composition of the invention may comprise a phosphate ester adjuvant (or blend thereof) in an amount in the range of about 0.1% to about 5% w/v of the mixture and/or composition, e.g., about 0.1, 0.2, 0.3, 0.4, 0.5, 0.6, 0.7. 0.8, 0.9, 1, 1.1, 1.2, 1.3, 1.4, 1.5, 1.6, 1.7, 1.8, 1.9, 2, 2.25, 2.5, 2.75, 3, 3.25, 3.5, 3.75, 4, 4.25, 4.5, 4.75, 5% w/v, or any range or value therein, of the mixture and/or composition. Thus, in some embodiments, the amount of phosphate ester adjuvant in a mixture and/or composition that is a ready-to-use formulation may be in a range of about 0.1% to about 4%, about 0.1% to about 3%, about 0.1% to about 2%, about 0.1% to about 1%, about 0.1% to about 0.7%, about 0.2% to about 4%, about 0.2% to about 3%, about 0.2% to about 2%, about 0.2% to about 1% w/v, about 0.2% to about 0.6% w/v, or any range or value therein, of the mixture and/or composition. In some embodiments, the amount of phosphate ester adjuvant in a ready-to-use formulation may be in the range of about 0.5% w/v of the mixture and/or composition. In some embodiments, the amount of triclopyr in a ready-to-use formulation may be about 0.25% w/v of the mixture and/or composition. In some embodiments, a ready-to-use formulation of a mixture and/or composition of the invention may comprise an amount of triclopyr of about 0.55% w/v of the mixture and/or composition and an amount of phosphate ester adjuvant of about 0.5% w/v of the mixture and/or composition. In some embodiments, a ready-to-use formulation of a mixture and/or composition of the invention may comprise an amount of triclopyr of about 0.275% w/v of the mixture and/or composition and an amount of phosphate ester adjuvant of about 0.25% w/v of the mixture and/or composition.

The present invention further provides methods of using the synergistic herbicidal mixture or composition(s) of the present invention.

In some embodiments, the present invention provides a method of controlling plant growth comprising contacting a plant, plant part, and/or a plant environment with an effective amount of a synergistic herbicidal mixture of the present invention as described herein.

In some embodiments, the present invention provides a method of controlling plant growth comprising contacting a plant, plant part, and/or a plant environment with an effective amount of a composition comprising triclopyr (3,5,6-Trichloro-2-pyridinyloxyacetic acid), a salt thereof and/or an ester thereof as described herein, and a composition comprising a phosphate ester adjuvant as described herein. In some embodiments, the composition comprising triclopyr and the composition comprising at least one phosphate ester adjuvant may be applied to a plant, plant part, and/or plant environment concurrently or separately. In some embodiments, the composition comprising triclopyr may be mixed with the composition comprising at least one phosphate ester adjuvant, and thus, contacted with a plant, plant part, and/or a plant environment as a single composition. When applied separately, the composition comprising triclopyr may be applied to the plant, plant part, and/or plant environment prior to, concurrently with, or after the composition comprising at least one phosphate ester adjuvant. In some embodiments, when applied separately, the time between the application of the composition comprising triclopyr and the composition comprising at least one phosphate ester adjuvant may be about 1 minute to about 12 hours or about 1 minute to about 24 hours, e.g., about 1, 2, 3, 4, 5, 6, 7, 8, 9, 10, 15, 20, 25, 30, 45, 50, 55 or 60 minutes or any value or range therein, or about 1, 2, 3, 4, 5, 6, 7, 8, 9, 10, 11, 12, 13, 14, 15, 16, 17, 18, 19, 20, 21, 22, 23, or 24 hours or any value or range therein, or about 1 or 2 days or any value or range therein.

In some embodiments, controlling plant growth may comprise a reduced time to observable (by sight; visual) phytotoxicity (e.g., symptoms of phytotoxicity, e.g., dehydration, wilting, leaf curling, discoloration, and necrosis) to a plant and/or plant part after contact with the composition(s) as compared to a control (e.g., the plant and/or plant part contacted with the triclopyr or the phosphate ester adjuvant alone). In some embodiments, the time to observable phytotoxicity to the plant and/or plant part may be about 3 days to about 6 days after contact with the composition(s), e.g., about 3, 4, 5, or 6 days, or any value or range therein. In some embodiments, the time to observable phytotoxicity to a plant and/or plant part after contact with the mixtures and/or composition(s) of the invention may be reduced by at least about 50% as compared to the plant and/or plant part contacted with triclopyr alone or the phosphate ester adjuvant alone, e.g., at least about 50%, 55%, 60%, 65%, 70%, 75%, 80%, 85%, 90%, 95%, 96%, 97%, 98%, 99% or 100%, and any range or value therein, as compared to a control (e.g., the plant and/or plant part contacted with the triclopyr alone or the phosphate ester adjuvant alone). In some embodiments, the time to observable phytotoxicity may be reduced by about 50% to about 100%, about 55% to about 100%, about 65% to about 100%, about 70% to about 100%, about 75% to about 100%, about 80% to about 100%, about 50% to about 75%, about 50% to about 80%, about 50% to about 95%, about 65% to about 75%, about 65% to about 85%, about 65% to about 100%, and the like, and any range or value therein. In some embodiments, the time to observable phytotoxicity may be reduced by at least about 10%. In some embodiments, the time to observable phytotoxicity may be reduced by at least about 25%. In some embodiments, the time to observable phytotoxicity may be reduced by at least about 50%.

Thus, in some embodiments, the present invention provides a method of reducing time to observable phytotoxicity of a plant and/or plant part comprising contacting a plant, plant part, and/or a plant environment with an effective amount of a synergistic herbicidal mixture of the present invention as described herein. In some embodiments, the present invention provides a method of reducing time to observable phytotoxicity comprising contacting a plant, plant part, and/or a plant environment with an effective amount of a composition comprising triclopyr (3,5,6-Trichloro-2-pyridinyloxyacetic acid), a salt thereof and/or an ester thereof, as described herein, and a composition comprising a phosphate ester adjuvant as described herein.

In some embodiments, controlling plant growth may comprise residual control of the plant or plant part. In some embodiments, residual control of the plant or plant part may be increased as compared to a control (e.g., the plant and/or plant part contacted with the triclopyr or the phosphate ester adjuvant alone). In some embodiments, residual control of a plant or plant part contacted with the mixtures and/or compositions of the invention (or a plant or plant part in a plant environment that has been contacted with the mixtures and/or compositions of the invention) may be over a period of time in the range of about 6 to about 24 months after contacting the plant, plant part or the plant environment, e.g., about 6, 7, 8, 9, 10, 11, 12, 13, 14, 15, 16, 17, 18, 19, 20, 21, 22, 23, or 24 months, or any value or range therein, after contacting the plant, plant part or the plant environment. In some embodiments, residual control of a plant or plant part may be over a period of time in the range of about 6 to about 12 months (e.g., about 6, 7, 8, 9, 10, 11, or 12 months, or any value or range therein). In some embodiments, residual control of the plant or plant part may be over a period of time of about 10 to about 16 months (e.g., about 10, 11, 12, 13, 14, 15, 16 months, or any value or range therein). In some embodiments, residual control of the plant or plant part may be over a period of time of about 4 to about 20 months (e.g., about 4, 5, 6, 7, 8, 9, 10, 11, 12, 13, 14, 15, 16, 17, 18, 19, 20 months, or any value or range therein). In some embodiments, residual control may be improved/increased by about 6 months to about 8 months (e.g., about 6, 7, or 8 months, or any value or range therein) as compared to a control (e.g., the plant or plant part contacted with the triclopyr alone or the phosphate ester adjuvant alone, e.g., as compared to the time during which the growth of the plant or plant part is controlled when contacted with the triclopyr alone or the phosphate ester adjuvant alone).

Thus, in some embodiments, the present invention provides a method of providing residual control of a plant and/or plant part comprising contacting a plant, plant part, and/or a plant environment with an effective amount of a synergistic herbicidal mixture of the present invention as described herein. In some embodiments, the present invention provides a method of providing residual control of a plant and/or plant part comprising contacting a plant, plant part, and/or a plant environment with an effective amount of a composition comprising triclopyr (3,5,6-Trichloro-2-pyridinyloxyacetic acid), a salt thereof and/or an ester thereof, as described herein, and a composition comprising a phosphate ester adjuvant as described herein.

In some embodiments, controlling plant growth may comprise increased control of seed germination as compared to a control (e.g., the plant, plant part, and/or plant environment contacted with the triclopyr alone or the phosphate ester adjuvant alone). In some embodiments, increased control of seed germination may comprise a reduction in seed germination and/or a reduction in seed germination over time. In some embodiments, seed germination may be reduced by about 5% to about 100% (e.g., about 5, 10, 15, 20, 25, 30, 35, 40, 45, 50, 55, 60, 65, 70, 75, 80, 85, 90, 95, or 100%, or any range or value therein) as compared to a control (e.g., seeds contacted with the triclopyr alone or the phosphate ester adjuvant alone, or seeds located in a plant environment that has been contacted with the triclopyr alone or the phosphate ester adjuvant alone). Thus, in some embodiments, the methods of the invention may result in seed germination of about 0% to about 5%, 0% to about 10%, about 0% to about 15%, about 0% to about 20%, and any range or value therein, as compared to a control.

Thus, in some embodiments, the present invention provides a method of reducing seed germination, the method comprising contacting a plant, plant part (e.g. a seed) and/or a plant environment with an effective amount of a synergistic herbicidal mixture of the present invention as described herein. In some embodiments, the present invention provides a method of reducing seed germination, the method comprising contacting a plant, plant part (e.g. a seed) and/or a plant environment with an effective amount of a composition comprising triclopyr (3,5,6-Trichloro-2-pyridinyloxyacetic acid), a salt thereof and/or an ester thereof, as described herein, and a composition comprising a phosphate ester adjuvant as described herein.

In some embodiments, methods of the present invention may provide reduced seed germination over a greater period of time than a control (e.g., seeds contacted with triclopyr alone or the phosphate ester adjuvant alone, or seeds located in a plant environment that has been contacted with triclopyr alone or the phosphate ester adjuvant alone). Thus, in some embodiments, seed germination may be reduced for about 6 months to about 24 months (e.g., about 6, 7, 8, 9, 10, 11, 12, 13, 14, 15, 16, 17, 18, 19, 20, 21, 22, 23, or 24 months, or any value or range therein; e.g., about 6 month to about 12 months, about 6 months to 18 months, about 10 months to about 18 months, about 10 months to about 20 months, about 10 months to about 24 months, and the like and any range or value therein) after contact with the compositions and/or mixtures of the invention. In some embodiments, the methods of the present invention may reduce seed germination by about 5% to about 100% over a period of time from about 6 months to about 24 months (e.g., about 5, 10, 15, 20, 25, 30, 35, 40, 45, 50, 55, 60, 65, 70, 75, 80, 85, 90, 91, 92, 93, 94, 95, 96, 97, 98, 99, or 100%, or any value or range therein, over a period of time from about 6, 7, 8, 9, 10, 11, 12, 13, 14, 15, 16, 17, 18, 19, 20, 21, 22, 23, or 24 months, or any value or range therein). In some embodiments, the methods of the present invention may reduce seed germination by about 25% to about 100%, about 50% to about 100%, about 75% to about 100%, about 90% to about 100%, about 25% to about 95%, about 50% to about 95%, about 75% to about 95%, about 90% to about 95%, or any value or range therein, or about 30%, 40%, 50%, 60%, 65%, 70%, 75% to about 80%, 85%, 90%, 95%, 96%, 97%, 98%, 99%, 100%, or any value or range therein, over a period of time from about 6 months to about 24 months, as compared to a control.

Thus, in some embodiments, the present invention provides a method of reducing seed germination over a greater period of time than a control (e.g., seeds contacted with triclopyr alone or the phosphate ester adjuvant alone, or seeds located in a plant environment that has been contacted with triclopyr alone or the phosphate ester adjuvant alone), the method comprising contacting a plant, plant part (e.g., a seed) and/or a plant environment with an effective amount of a synergistic herbicidal mixture of the present invention as described herein. In some embodiments, the present invention provides a method of reducing seed germination over a greater period of time than a control, the method comprising contacting a plant, plant part (e.g., a seed) and/or a plant environment with an effective amount of a composition comprising triclopyr (3,5,6-Trichloro-2-pyridinyloxyacetic acid) and/or a salt thereof and/or an ester thereof, as described herein, and a composition comprising a phosphate ester adjuvant as described herein.

In some embodiments, a plant and/or plant part useful with this invention (e.g., for which control of growth may be desirable) may be a broadleaf (dicot) plant. In some embodiments, a plant and/or plant part useful with this invention (e.g., for which control of growth may be desirable) may be a monocot. A non-limiting example of a dicot useful with this invention may be a grass. In some embodiments, a plant and/or plant part useful with this invention (e.g., for which control of growth may be desirable) may include but is not limited to, alder, Arkansas rose, arrowwood, ash, aspen, beech, bindweed, birch, blackberry, blackgum, black medic, box elder, Brazilian pepper, buckthorn, burdock, California rose, Canada thistle, Carolina geranium, cascara, ceanothus, cherry, chickweed mouse ear, chicory, chinquapin, choke cherry, clover, common chickweed, cottonwood, crataegus, curly dock, dandelion, douglas fir, dogwood, elderberry, elm, evening primrose, field bindweed, field horsetail rush, florida pusley, hawthorn, hazel, henbit, honeysuckle, hornbeam, Japanese knotweed, kudzu, lambsquarter, lespedeza, locust, madrone, maples, mesquite, mimosa, morning glory (bindweed), mulberry, multiflora rose, oaks, oxalis, parsley-piert, persimmon, pine, plantain, poison ivy, poison oak, poplar, purple loosestrife, ragweed, raspberry, salmonberry, sassafras, scotch broom, smartweed, spurge, sumac, sweetbay magnolia, sweetgum, sycamore, tanoak, tansy ragwort, thimbleberry, thistle, trumpet creeper, tulip poplar, vetch, Virginia creeper, western hemlock, wild grape, wild lettuce, wild onion, wild rose, wild violet, willow, winged elm, or yellow rocket. In some embodiments, the plant and/or plant part may be poison ivy, Japanese stilt grass, kudzu, or bamboo.

The present inventors have surprisingly discovered that the growth of some plants (e.g., plant species/genera/varieties) not typically controlled by the herbicide triclopyr, can be controlled when the triclopyr is combined with at least one phosphate ester adjuvant as described herein. Thus, the mixtures and compositions of the invention may extend the range of plants (plant species or genera or variety) against which triclopyr is an effective herbicide (e.g., results in reduced growth and/or death of the plant). Thus, triclopyr, a salt thereof and/or an ester thereof when combined with at least one phosphate ester adjuvant may provide control of the growth of a plant species/genera/variety and/or plant part thereof that is not otherwise controlled by triclopyr (e.g., triclopyr in the absence of at least one phosphate ester adjuvant does not control the growth of the plant species/genera/variety or part thereof), thereby extending range of plants against which triclopyr has an herbicidal effect. Thus, in some embodiments, the present invention provides a method of extending the range of plants for which triclopyr is an effective herbicide, the method comprising contacting a plant, plant part (i.e., a plant, plant part not susceptible to the herbicidal effects of triclopyr alone or in the absence of at least one phosphate ester adjuvant), and/or a plant environment with an effective amount of a synergistic herbicidal mixture of the present invention as described herein. In some embodiments, the present invention provides a method of extending the range of plants for which triclopyr is an effective herbicide, the method comprising contacting a plant, plant part (i.e., a plant, plant part not susceptible to the herbicidal effects of triclopyr alone or in the absence of at least one phosphate ester adjuvant), and/or a plant environment with an effective amount of a composition comprising triclopyr, a salt thereof and/or an ester thereof, as described herein, and a composition comprising at least one phosphate ester adjuvant as described herein. In some embodiments, a plant and/or plant part thereof to which the mixtures and compositions of the invention may extend the herbicidal effectiveness of triclopyr include, but are not limited to, English ivy, Japanese stilt grass, and bamboo.

The invention will now be described with reference to the following examples. It should be appreciated that these examples are not intended to limit the scope of the claims to the invention, but are rather intended to be exemplary of certain embodiments. Any variations in the exemplified methods that occur to the skilled artisan are intended to fall within the scope of the invention.

EXAMPLES

Example 1. Triclopyr-Adjuvant Treatment of Japanese Stilt Grass

The objective of the trial was to measure the effects of Hostaphat®1306 (CAS #73038-25-2; alkyl polyethylene glycol ether phosphoric acid mono/diester (50/50), acid form) in combination with triclopyr (as BioAdvanced Brush Killer Plus®; 8.8% triclopyr) at different concentrations against the evasive weed species Japanese stilt grass (*Microstegium vimineum*). The trial was conducted in a recreational setting at a golf course. Plots were 2×2 meters and the treatments consisted of triclopyr in the form of BioAdvanced BushKiller Plus® 8.8% triclopyr mixed to a 0.55% w/v concentration for all the treatments, while the concentration of the adjuvant Hostaphat®1306 was varied at 0, 0.1, 0.25 and 0.5% ai/v (i.e., % weight of the active ingredient (w)/v) (Table 1). Controls included an untreated check group, and adjuvant-only treatment group treated with 0.5% ai/v Hostaphat®1306. An additional treatment of 0.55% w/v triclopyr with 0.375% ai/v adjuvant was added later to the trail. All treatments and controls were repeated in triplicate (i.e., three plots per group). The plots were treated at the standard rate of 2 gallons (gal) of mixed product per 1000 square feet. The plots were rated for the percent Japanese stilt grass in each plot. Several plots showed 100 percent coverage prior to the start of the trial. Trial was observed for the presence of Japanese stilt grass in each plot over time. Residual control of plant growth will be evaluated over time using the same plot/trial.

Figure 2:
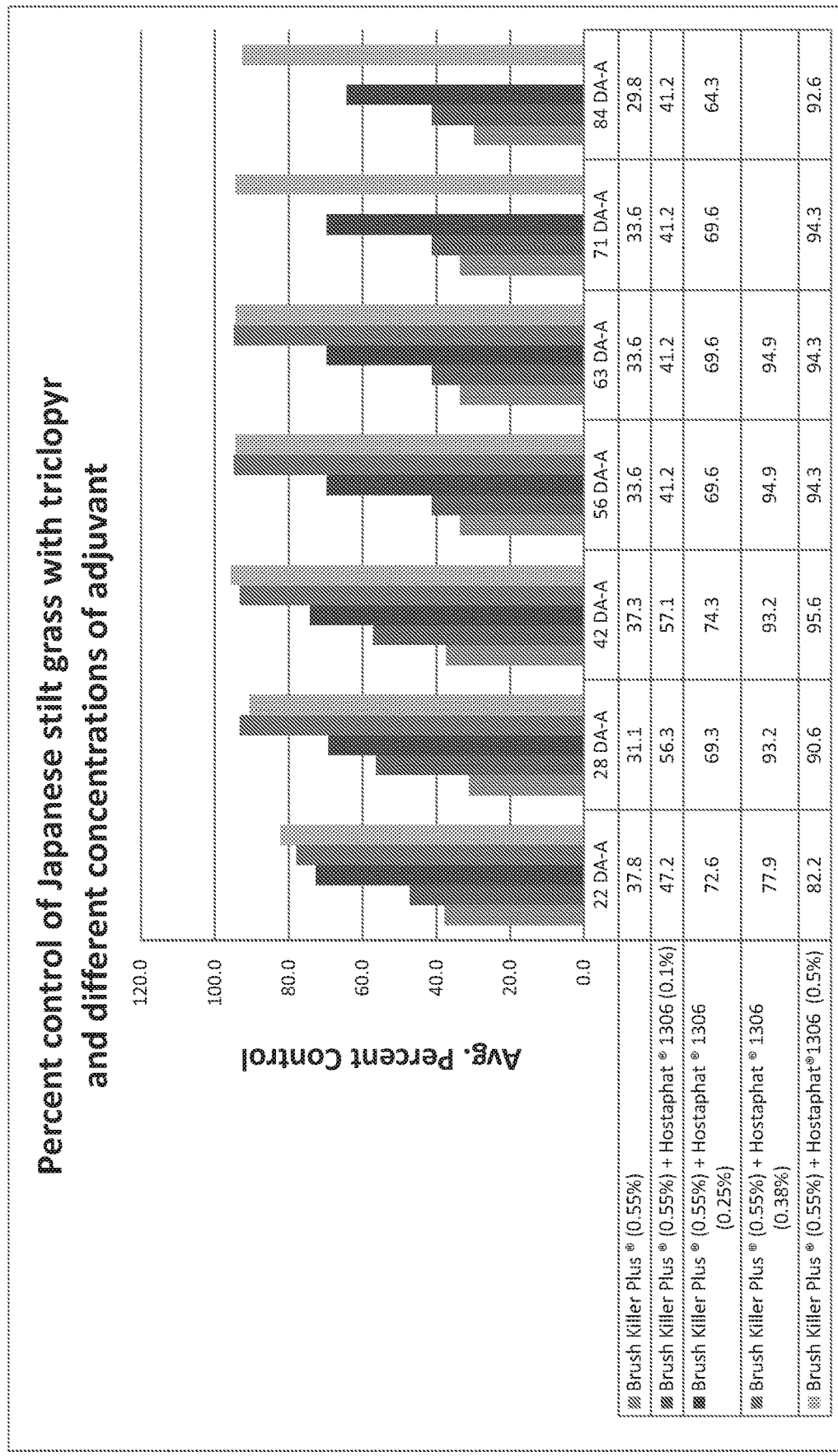
FIG. 2 shows the percent control of Japanese stilt grass with triclopyr (Brush Killer Plus®) plus the adjuvant Hostaphat® 1306 (active ingredient: alkyl polyethylene glycol ether phosphoric acid mono/diester (50/50), acid form) at different adjuvant concentrations. Treatment groups shown are same as in FIG. 1.

The results showed that triclopyr by itself at the 0.55% w/v concentration did not control Japanese stilt grass in the trial (about 40 to 43.33%). The adjuvant by itself showed no phytotoxicity on the Japanese stilt grass, and left alone the Japanese stilt grass overran all the plots. The treatments with the adjuvant and triclopyr showed a gradient effect where the more adjuvant that was added the better control of the Japanese stilt grass (FIGS. 1-2). The 0.1% w/v adjuvant with triclopyr achieved the similar results as the triclopyr without adjuvant, 0.25% w/v adjuvant with triclopyr showed about 75% control of the Japanese stilt grass, and the adjuvant with triclopyr demonstrated about 95% control for 84 days for the adjuvant at 0.5% w/v and for 56 days for the adjuvant at 0.38% w/v (introduced after the trial was initiated). Residual control of plant growth will be evaluated over time using the same plot/trial.

It was determined that above the 0.25% w/v adjuvant concentration was needed in combination with the triclopyr in order to provide acceptable commercial control.

TABLE 1

Japanese stilt grass treatment groups

| Treatment No. | Treatment Name | Active ingredient concentration | Treatment Rate | Applied on DA-A |
|---|---|---|---|---|
| 1 | Untreated Check | | | 0 |
| 2 | Brush Killer Plus ® | 8.8 % | 0.55 % ai/v* | 0 |
| 3 | Brush Killer Plus ® | 8.8 % | 0.55 % ai/v | 0 |
|   | Hostaphat ® 1306 | 100 % | 0.1 % ai/v | |
| 4 | Brush Killer Plus ® | 8.8 % | 0.55 % ai/v | 0 |
|   | Hostaphat ® 1306 | 100 % | 0.25 % ai/v | |
| 5 | Brush Killer Plus ® | 8.8 % | 0.55 % ai/v | 0 |
|   | Hostaphat ® 1306 | 100 % | 0.5 % ai/v | |
| 6 | Hostaphat ® 1306 | 100 % | 0.5 % ai/v | 0 |
| 7 | Brush Killer Plus ® | 8.8 % | 0.55 % ai/v | 28 |
|   | Hostaphat ® 1306 | 100 % | 0.38 % ai/v | |

*% ai/w = weight of the active ingredient (w)/v)

Example 2. Triclopyr-Adjuvant Treatment of English Ivy

The objective of the trial was to measure the effects of adjuvants in the same class of chemistry in the control of the evasive weed species English ivy (*Hedera helix*). The trial was conducted in a recreational setting at a golf course. Plots were 2×2 meters and the treatments consisted of triclopyr in the form of BioAdvanced Brush Killer Plus® 8.8% triclopyr mixed to a 0.55% w/v concentration for all the treatments, and various adjuvants treated at 0.5% ai/v (i.e., % w/v of the active ingredient) (Table 2). Controls included an untreated check group. All treatments and controls were repeated in triplicate (i.e., three plots per group). The plots were treated at the standard rate of 2 gal of mixed product per 1000 square feet. The plots were rated for the percent English Ivy in each plot. Several plots showed 80 percent and above coverage prior to the start of the trial. Trial was observed over time for the presence of English ivy in each plot.

Figure 3:
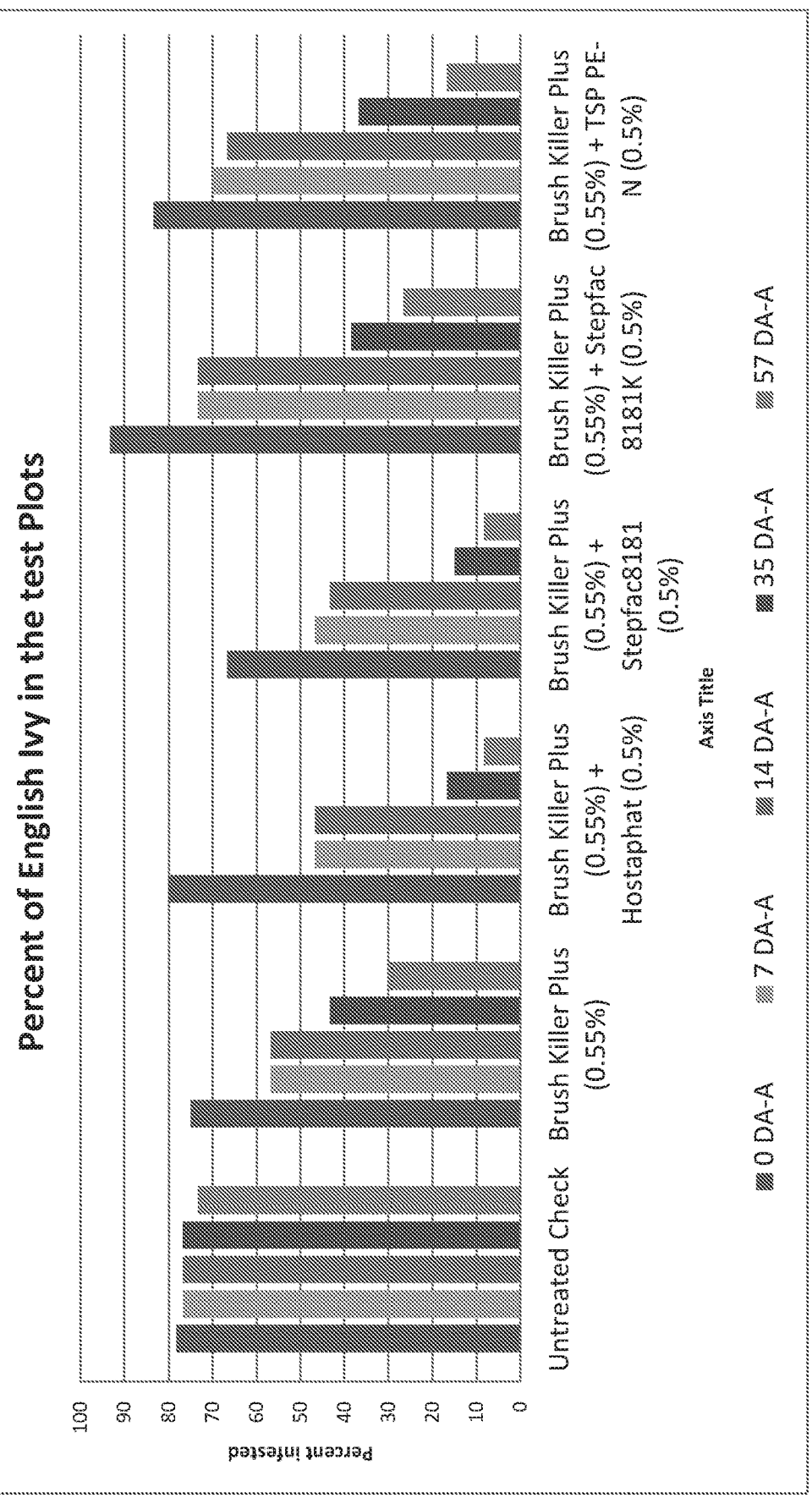
FIG. 3 shows the percent infested of English ivy in test plots. Treatment groups shown are an untreated check, triclopyr alone (Brush Killer Plus®) at 0.55% w/v, and triclopyr (Brush Killer Plus®) at 0.55% w/v with adjuvants Hostaphat® 1306 (active ingredient: alkyl polyethylene glycol ether phosphoric acid mono/diester (50/50), acid form), Stepfac®8181 (active ingredient: tridecyl alcohol ethoxylate phosphate ester, POE-6); Stepfac® 8181K (active ingredient: tridecyl alcohol ethoxylate phosphate ester, POE-6 K Salt), or Stepfac® TSP PE-N (active ingredient: tristyrylphenol ethoxylate, POE-16, phosphate ester TEA Salt), each at 0.55% w/v. In each set of five columns, the first column is 0 DA-A, the second column is 7 DA-A, the third column is 14 DA-A, the fourth column is 35 DA-A, and the fifth column is 57 DA-A.
Figure 4:
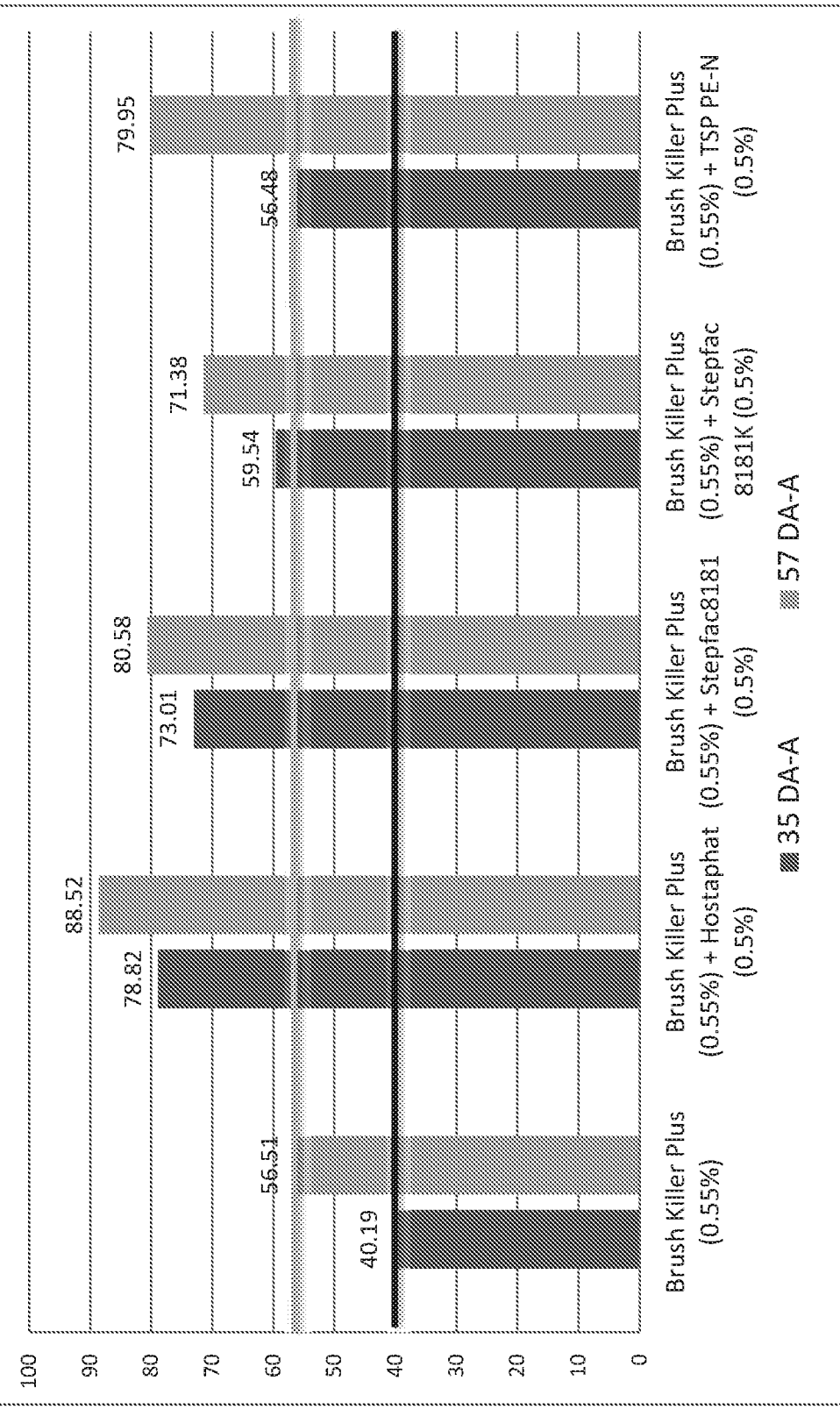
FIG. 4 shows the percent control of English ivy. Treatment groups shown are same as in FIG. 3.

The results showed that triclopyr by itself could only obtain about 53% control of the English ivy in the test plots, while triclopyr when combined with the adjuvants obtained 80 to 88 percent control (FIGS. 3-4). The results indicated that the inclusion of the adjuvants increased the control of English ivy 27% to 35% better with a single application well within commercially acceptable ranges.

TABLE 2

| | English ivy treatment groups | | |
|---|---|---|---|
| Treatment No. | Treatment Name | Active ingredient concentration | Treatment Rate |
| 1 | Untreated Check | | |
| 2 | Brush Killer Plus ® | 8.8% | 0.55% ai/v* |
| 3 | Brush Killer Plus ® | 8.8% | 0.55% ai/v |
| | Hostaphat ® 1306 | 100% | 0.5% ai/v |
| 4 | Brush Killer Plus ® | 8.8% | 0.55% ai/v |
| | Stepfac ® 8175 | 100% | 0.5% ai/v |
| 5 | Brush Killer Plus ® | 8.8% | 0.55% ai/v |
| | Stepfac ® 8181 | 100% | 0.5% ai/v |
| 6 | Brush Killer Plus ® | 8.8% | 0.55% ai/v |
| | Stepfac ® 8181K | 100% | 0.5% ai/v |
| 7 | Brush Killer Plus ® | 8.8% | 0.55% ai/v |
| | Stepfac ® TSP PE-N | 100% | 0.5% ai/v |

*% ai/w = weight of the active ingredient (w)/v

TABLE 3

| | Brush treatment groups. | | |
|---|---|---|---|
| Treatment No. | Treatment Name | Active ingredient concentration | Treatment Rate |
| 1 | Untreated Check | | |
| 2 | Brush Killer Plus ® | 8.8% | 0.275% ai/v* |
| 3 | Brush Killer Plus ® | 8.8% | 0.55% ai/v |
| 4 | Brush Killer Plus ® | 8.8% | 0.8% ai/v |
| 5 | Brush Killer Plus ® | 8.8% | 0.275% ai/v |
| | Hostaphat ® 1306 | 99% | 0.1% ai/v |
| 6 | Brush Killer Plus ® | 8.8% | 0.275% al/v |
| | Synergen ® KN | 99% | 0.1% ai/v |
| 7 | Brush Killer Plus | 8.8% | 0.275% ai/v |
| | Synergen ® ACE | 99% | 4.1% ai/v |
| 8 | Brush Killer Plus | 8.8% | 0.275% ai/v |
| | Synergen ® GA | 99% | 0.1% ai/v |

*% ai/w = weight of the active ingredient (w)/v

Example 3. Triclopyr-Adjuvant Treatment of Brush

The objective of the trial was to determine the effects of concentration and adjuvant on triclopyr and its residual control of brush. The trial was conducted in a recreational setting at a golf course. Plots were 1×1 meters and the treatments comprised BioAdvanced Brush Killer Plus® (8.8% triclopyr) mixed to 0.275% ai/v with various adjuvants treated at 0.1% ai/v (i.e., % weight of the active ingredient per volume) (Table 3), Controls included an untreated check group and triclopyr alone at three concentrations (0.275, 0.55, and 0.8% ai/v). All treatments and controls were repeated in triplicate (i.e., three plots per group). The plots were treated at the standard rate of 2 gal of mixed product per 1000 square feet. The plots were rated for the percent of brush (e.g., poison ivy, poison oak, black berries, etc.) in each plot. Several plots showed 80 percent and above coverage by the brush prior to the start of the trial. The trial was observed for the presence of brush in each plot throughout the trial. The observations were based upon the amount of clear area (without vegetation) in each plot.

Figure 5:
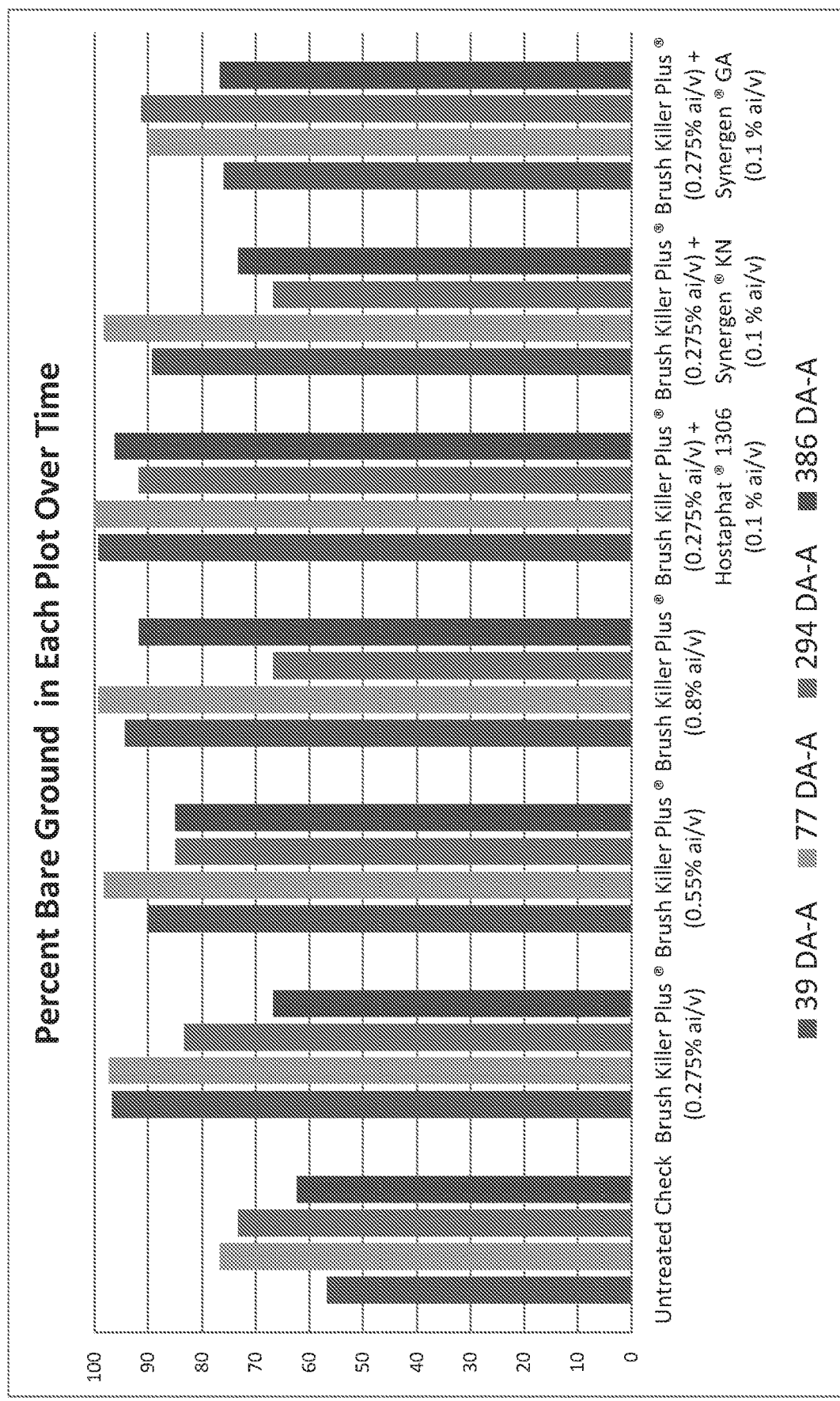
FIG. 5 shows the percent of bare ground exposed in each plot over time in brush plots comprising poison ivy, poison oak, and black berries. Treatment groups shown are an untreated check, triclopyr (Brush Killer Plus®) alone at 0.275% w/v, alone at 0.55% w/v, and alone at 0.8% w/v, and triclopyr at 0.275% w/v with three different adjuvants each at 0.1% w/v (Hostaphat® 1306 (active ingredient: alkyl polyethylene glycol ether phosphoric acid mono/diester (50/50), acid form), Synergen® KN (active ingredient: ethoxylated C12-16 alcohols), and Synergen® GA (active ingredient: C8/C10 glucamide)). In each set of four columns, the first column is 39 DA-A, the second column is 77 DA-A, the third column is 294 DA-A, and the fourth column is 386 DA-A. % ai/v=% weight of the active ingredient/v.

The results showed that the higher the concentration of the triclopyr the longer the residual efficacy. The addition of Hostaphat® 1306 adjuvant to the 0.275% ai/v triclopyr maintained the bare ground better than the triclopyr at 0.8% ai/v (FIG. 5).

Example 4. Triclopyr-Adjuvant Treatment of Macartney Rose

Macartney rose, also known as "Cherokee rose", "hedge" and "rose hedge", forms dense, impenetrable thickets. It was originally brought in from Asia in the 1800's for use as a hedge but has escaped and is now considered an invasive species. Its control presents a severe management problem with the only methods recommended for control of this pest being restricted use pesticides and a mixture of other methods, which provide only limited control.

Figure 6:
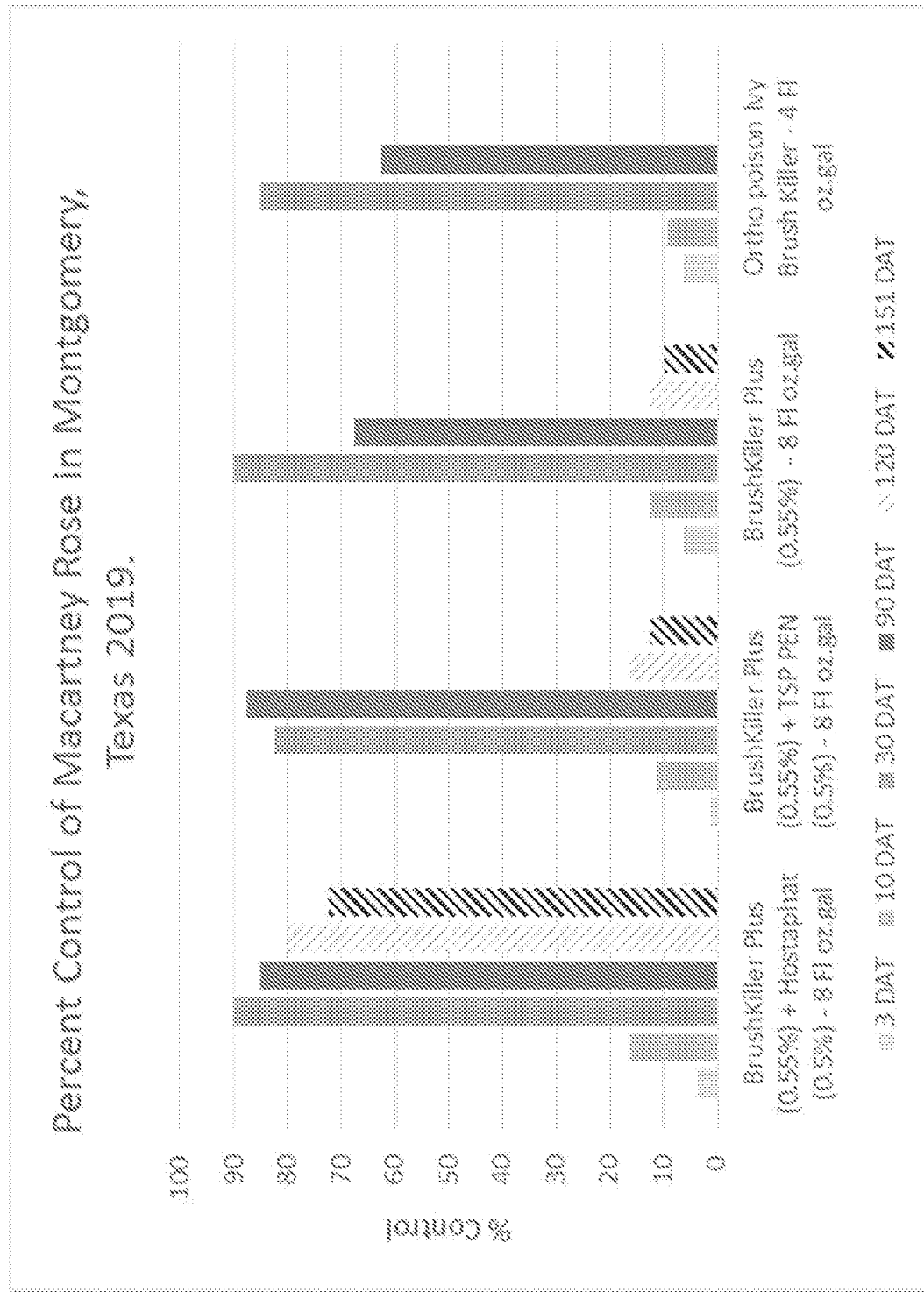
FIG. 6 shows the percent control of Macartney rose with triclopyr (Brush Killer Plus®) plus the adjuvant Hostaphat.

A trial was conducted to determine if the composition of this invention comprising triclopyr and at least one phosphate ester adjuvant would be an effective control method for this serious pest. The test was conducted in Montgomery, Texas in 2019. It was a randomized block design with 5 replications and control was monitored over time. The results are provided in Table 4 and FIG. 6.

TABLE 4

| | Brush treatment groups. | | | | | |
|---|---|---|---|---|---|---|
| | % Control | | | | | |
| | 3 DAT | 10 DAT | 30 DAT | 90 DAT | 120 DAT | 151 DAT |
| Untreated Check | 0 | 0 | 0 | 0 | 0 | 0 |
| BrushKiller Plus (0.55%) + Hostaphat (0.5%) - 8 Fl oz. gal | 3.8 | 16.3 | 90 | 85 | 80 | 72.5 |
| BrushKiller Plus (0.55%) + TSP PEN (0.5%) - 8 Fl oz. gal | 1.3 | 11.3 | 82.5 | 87.5 | 16.3 | 12.5 |
| BrushKiller Plus (0.55%) - 8 Fl oz. gal | 6.3 | 12.5 | 90 | 67.5 | 12.5 | 10 |
| BrushKiller Plus (0.275%) - 4 Fl oz. gal | 6.3 | 9.3 | 85 | 62.5 | 0 | 0 |

The results show a slightly quicker efficacy through the first 10 days than the control, reaching its apex around 30 days after treatment. The efficacy of the control decreased at Day 90 with only the Brushkiller Plus+the two new adjuvants continuing to show 70% control or better. The triclopyr and a phosphate ester adjuvant (e.g., BrushKiller Plus with Hostaphat) was the only treatment that showed commercially acceptable control thorough 151 days after treatment.

Example 5. Triclopyr-Adjuvant Treatment of Japanese Stilt Grass

Figure 7:
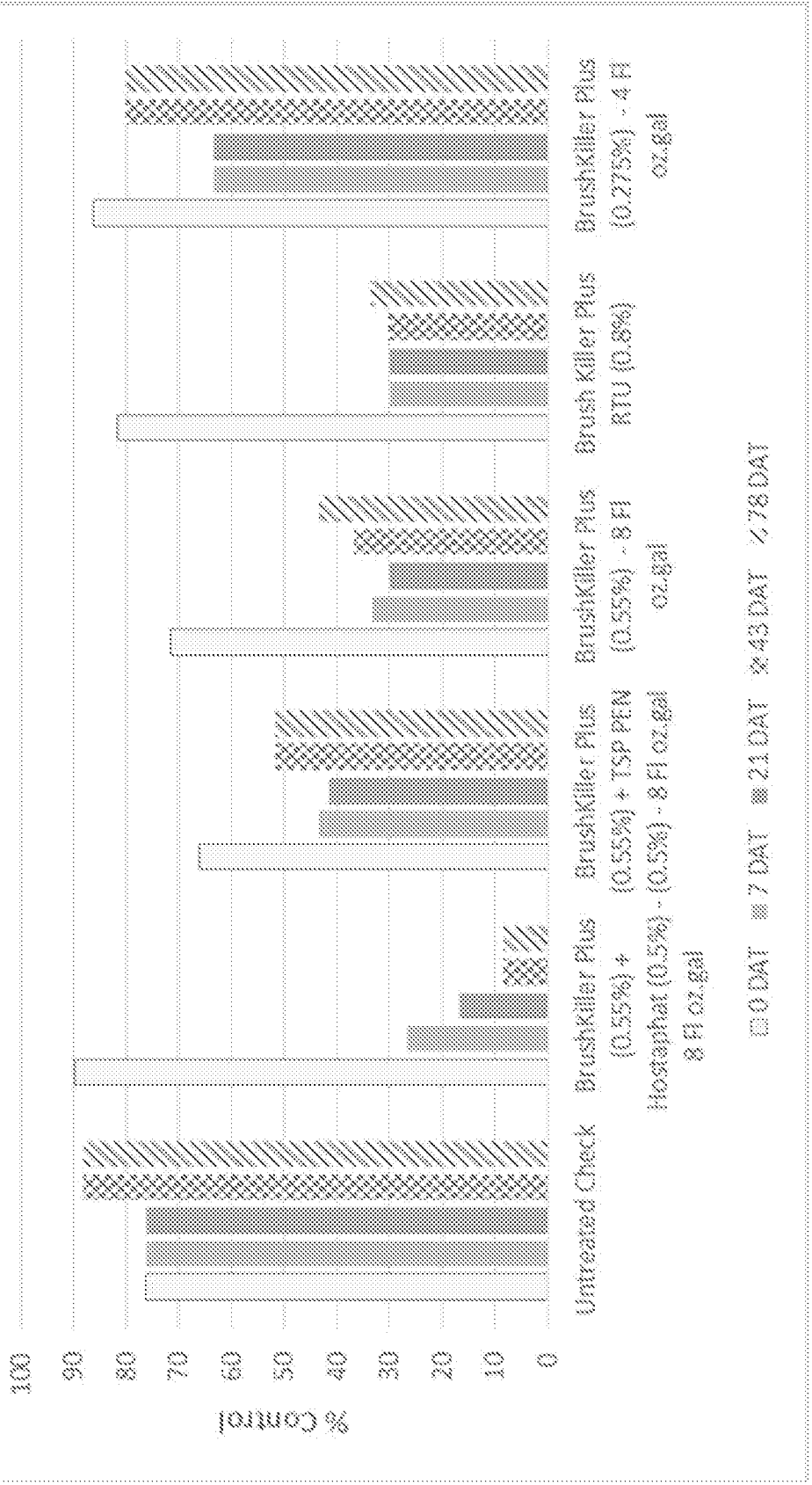
FIG. 7 shows the percent control of Japanese stilt grass with triclopyr (Brush Killer Plus®) plus the adjuvant Hostaphat.

A further trial was carried out to demonstrate the effectiveness of the triclopyr-phosphate adjuvant treatment for control of Japanese stilt grass. The results are provided in Table 5 and FIG. 7.

TABLE 5

| Japanese stilt grass treatment groups | | | | | |
|---|---|---|---|---|---|
| | AREA P PERCEN % 0 DAT | AREA P PERCEN % 7 DAT | AREA P PERCEN % 21 DAT | AREA P PERCEN % 43 DAT | AREA P PERCEN % 78 DAT |
| Untreated Check | 76.3 | 76.3 | 76.3 | 88 | 88 |
| BrushKiller Plus (0.55%) + Hostaphat (0.5%) - 8 Fl oz. gal | 89.7 | 26.7 | 16.7 | 8.3 | 8.3 |
| BrushKiller Plus (0.55%) + TSP PEN (0.5%) - 8 Fl oz. gal | 66.3 | 43.3 | 41.7 | 51.7 | 51.7 |
| BrushKiller Plus (0.55%) - 8 Fl oz. gal | 71.7 | 33.3 | 30 | 36.7 | 43.3 |
| Brush Killer Plus RTU (0.8%) | 81.7 | 30 | 30 | 30 | 33.3 |
| BrushKiller Plus (0.275%) - 4 Fl oz. gal | 86.3 | 63.3 | 63.3 | 80 | 80 |

These results show once again that the best control, both in terms of level of control as well as length of control, was provided by the compositions of the invention comprising triclopyr and a phosphate ester adjuvant.

The foregoing is illustrative of the present invention, and is not to be construed as limiting thereof. The invention is defined by the following claims, with equivalents of the claims to be included therein.

That which is claimed is:

1. A synergistic herbicidal mixture comprising:
   triclopyr (3,5,6-trichloro-2-pyridinyloxyacetic acid), a salt or an ester thereof, and
   an adjuvant comprising a phosphate ester,
   wherein the triclopyr, salt or ester thereof and the adjuvant are present in the mixture in an amount that provides synergistic herbicidal activity.

2. The synergistic herbicidal mixture of claim 1, wherein the salt comprises triethylamine (TEA), lithium, sodium, potassium, or tetrasubstituted ammonium and/or triclopyr butoxyethyl ester.

3. The synergistic herbicidal mixture of claim 2, wherein the tetrasubstituted ammonium salt comprises choline, tetramethyl ammonium, or tetraethyl ammonium.

4. The synergistic herbicidal mixture of claim 1, wherein the phosphate ester is selected from the group consisting of an alkyl polyethylene glycol ether phosphoric acid mono/diester (50/50), acid form; a phosphated nonylphenol ethoxylate; a phosphated nonylphenol ethoxylate, partial sodium salt; a tristyrylphenol ethoxylate phosphate ester in the form of an acid; an ethoxylated polyarylphenol phosphate ester; an ethoxylated tristyrylphenol phosphate potassium salt; a tridecyl alcohol ethoxylate phosphate ester, polyoxyethylene (6); a tridecyl alcohol ethoxylate phosphate ester salt, polyoxyethylene (6) K salt; an ethoxylated alcohol phosphate ester; a nonylphenol ethoxylate phosphate ester, polyoxyethylene (12); a tristyrylphenol ethoxylate, polyoxyethylene (16), phosphate ester triethanolamine salt; and a combination thereof.

5. The synergistic herbicidal mixture of claim 1, wherein the herbicidal mixture comprises the triclopyr, salt or ester thereof in an amount of about 0.05% weight/volume (w/v) to about 10% w/v of the mixture.

6. The synergistic herbicidal mixture of claim 1, wherein the herbicidal mixture comprises the adjuvant in an amount of about 0.01% w/v to about 10% w/v of the mixture.

7. The synergistic herbicidal mixture of claim 1, wherein the synergistic herbicidal mixture is in the form of a liquid, a solid, a flowable mixture, a slurry, a powder, a particle, a granule, a mist, an aerosol, a foam, or any combination thereof.

8. The synergistic herbicidal mixture of claim 1, further comprising water.

9. The synergistic herbicidal mixture of claim 1, wherein the adjuvant further comprises a methylated seed oil (MSO); a combination of alkanolamides, free fatty acids, alkyl aryl polyoxylkane ethers, and dimethylpolysiloxane; a C8/C10 glucamide; and/or an ethoxylated C12-16 alcohol.

10. A method of controlling plant growth comprising contacting a plant, plant part, and/or plant environment with an effective amount of the synergistic herbicidal mixture of claim 1.

11. The method of claim 10, wherein controlling plant growth comprises a reduced time to observable phytotoxicity to the plant and/or plant part as compared to a control.

12. The method of claim 11, wherein the time to observable phytotoxicity to the plant and/or plant part is about 3 days to about 6 days after contacting the plant, plant part and/or plant environment.

13. The method of claim 11, wherein the time to observable phytotoxicity of the plant and/or plant part after contact is reduced by at least about 50% as compared to a control.

14. The method of claim 11, wherein controlling plant growth comprises residual control of the plant or plant part.

15. The method of claim 14, wherein the residual control of the plant or plant part is over a period of time of about 6 to about 24 months after contacting the plant, plant part or the plant environment.

16. The method of claim 14, wherein the residual control is increased as compared to a control.

17. The method of claim 10, wherein controlling plant growth comprises increased control of seed germination as compared to a control.

18. The method of claim 10, wherein the plant and/or plant part is a broadleaf plant or a dicot plant.

19. The method of claim 10, wherein the plant and/or plant part is a monocot.

20. The method of claim 10, wherein the plant and/or plant part is a grass.

21. The method of claim 10, wherein the plant and/or plant part is alder, Arkansas rose, arrowwood, ash, aspen, beech, bindweed, birch, blackberry, blackgum, black medic, box elder, Brazilian pepper, buckthorn, burdock, California rose, Canada thistle, Carolina geranium, cascara, ceanothus, cherry, chickweed mouse ear, chicory, chinquapin, choke cherry, clover, common chickweed, cottonwood, crataegus, curly dock, dandelion, douglas fir, dogwood, elderberry, elm, evening primrose, field bindweed, field horsetail rush, florida pusley, hawthorn, hazel, henbit, honeysuckle, hornbeam, Japanese knotweed, kudzu, lambsquarter, lespedeza, locust, madrone, maples, mesquite, mimosa, morning glory, bindweed, mulberry, multiflora rose, oaks, oxalis, parsley-piert, persimmon, pine, plantain, poison ivy, poison oak, poplar, purple loosestrife, ragweed, raspberry, salmonberry, sassafras, scotch broom, smartweed, spurge, sumac, sweetbay magnolia, sweetgum, sycamore, tanoak, tansy ragwort, thimbleberry, thistle, trumpet creeper, tulip poplar, vetch, Virginia creeper, western hemlock, wild grape, wild lettuce, wild onion, wild rose, wild violet, willow, winged elm, or yellow rocket.

22. The method of claim 10, wherein the plant and/or plant part is poison ivy, Japanese stilt grass, kudzu, or bamboo.

\* \* \* \* \*